(12) United States Patent
Zhao et al.

(10) Patent No.: US 11,598,392 B2
(45) Date of Patent: Mar. 7, 2023

(54) TRANSMISSION DEVICE, ELECTRIC VEHICLE COMPRISING DEVICE, AND METHOD FOR DRIVING DEVICE

(71) Applicants: Jiying Zhao, Bristol, WI (US); Delin Yan, Beijing (CN); Jianli Li, Xi'an (CN)

(72) Inventors: Jiying Zhao, Bristol, WI (US); Delin Yan, Beijing (CN); Jianli Li, Xi'an (CN)

( * ) Notice: Subject to any disclaimer, the term of this patent is extended or adjusted under 35 U.S.C. 154(b) by 0 days.

(21) Appl. No.: 17/389,328

(22) Filed: Jul. 29, 2021

(65) Prior Publication Data

US 2021/0356019 A1  Nov. 18, 2021

Related U.S. Application Data

(63) Continuation of application No. 16/641,627, filed as application No. PCT/CN2017/098837 on Aug. 24, 2017, now abandoned.

(51) Int. Cl.
*F16H 3/72* (2006.01)
*F16H 1/32* (2006.01)
(Continued)

(52) U.S. Cl.
CPC .................. *F16H 1/32* (2013.01); *B60K 1/02* (2013.01); *B60K 17/08* (2013.01); *B60K 17/12* (2013.01);
(Continued)

(58) Field of Classification Search
CPC . F16H 3/72; F16H 3/724; F16H 3/727; F16H 1/28–48; B60K 1/02
See application file for complete search history.

(56) References Cited

U.S. PATENT DOCUMENTS 5,195,600 A * 3/1993 Dorgan ................... F16H 47/04
                                                            180/9.1
5,295,925 A * 3/1994 Hirabayashi .......... F16H 1/2836
                                                            475/331
(Continued)

FOREIGN PATENT DOCUMENTS

CN      101265961 A     9/2008
CN      102133856       7/2011
(Continued)

OTHER PUBLICATIONS

Machine translated JP H07135701 A (Year: 1195).*
Extended European Search Report for corresponding European Application No. 17922906.7, dated Jul. 20, 2021, 19 pages.

*Primary Examiner* — Charles A Fox
*Assistant Examiner* — Farhana Pervin
(74) *Attorney, Agent, or Firm* — Loeb & Loeb LLP

(57) ABSTRACT

A transmission device capable of cooperating with a dual-power source and a driving method therefor, the transmission device includes a planetary gear assembly that is driven by the dual-power source; the planetary gear assembly comprises a sun gear, a rotating inner gear ring, and a planetary gear that is engaged between the sun gear and the rotating inner gear ring; the dual-power source comprises an input shaft, the input shaft being connected to the sun gear. The direction of the rotational movement of the planetary gear about the input shaft depends on the linear velocity V1 of pitch circle movement of the rotating inner gear ring and the linear velocity V2 of pitch circle movement of the sun gear.

15 Claims, 5 Drawing Sheets

(51) Int. Cl.
  *B60L 50/62* (2019.01)
  *B60K 17/12* (2006.01)
  *B60K 1/02* (2006.01)
  *B60K 17/08* (2006.01)

(52) U.S. Cl.
  CPC ............... *B60L 50/62* (2019.02); *F16H 3/72* (2013.01); *F16H 2001/327* (2013.01)

(56) References Cited

U.S. PATENT DOCUMENTS

| | | | |
|---|---|---|---|
| 8,795,117 B2 * | 8/2014 | Wenthen | F16H 3/72 475/5 |
| 2006/0009323 A1 * | 1/2006 | Zhang | B60W 10/08 475/5 |
| 2008/0261766 A1 * | 10/2008 | Koyama | F16H 37/022 475/280 |
| 2010/0041504 A1 * | 2/2010 | Palmer | F16H 3/724 475/149 |
| 2011/0212803 A1 | 9/2011 | Maas | |
| 2012/0165149 A1 * | 6/2012 | Morimoto | B60W 20/20 475/5 |
| 2016/0091060 A1 * | 3/2016 | Balenghien | F16H 3/72 475/6 |
| 2017/0151875 A1 * | 6/2017 | Campbell | B60L 3/0061 |
| 2021/0053434 A1 * | 2/2021 | Hao | B60K 6/365 |

FOREIGN PATENT DOCUMENTS

| | | |
|---|---|---|
| CN | 103754099 | 4/2014 |
| CN | 105034782 | 11/2015 |
| CN | 105150819 | 12/2015 |
| CN | 106015499 | 10/2016 |
| JP | H07135701 A | 5/1995 |
| JP | 08298748 | 11/1996 |
| JP | 2009144908 | 7/2009 |

* cited by examiner

TRANSMISSION DEVICE, ELECTRIC VEHICLE COMPRISING DEVICE, AND METHOD FOR DRIVING DEVICE

TECHNICAL FIELD

This disclosure relates to a transmission device, in particular to a transmission device capable of cooperating with a dual-power source. This disclosure also relates to an electric-driven vehicle comprising said transmission device with dual-power source and a method of driving said transmission device with dual-power source.

BACKGROUND TECHNOLOGY

Transmissions with planetary gears have tooth surface clearance (also called backlash) which cannot be eliminated, especially when the gears frequently change the direction of movement, which results in shocks, noise, wear and other problems caused by the collision between the teeth, thereby reducing the service life of the transmission and causing inaccurate accuracy during the operation of the transmission. In some high-end products with high precision, miniaturization, large torque and frequent change of output direction, such as RV reducer at each motion joint of industrial robot structure, in order to achieve high positioning accuracy and long service life of RV Reducer, it requires very high-end material selection and high manufacturing accuracy, which will inevitably lead to the increase of manufacturing cost. However, no matter how high the machining accuracy can be achieved, it is impossible to completely eliminate the tooth surface clearance when the teeth are engaged with each other (see FIG. 3). For example, when the planetary gear frequently changes the direction of motion, the fixed inner ring gear tooth surface will be frequently impacted by two forces in different directions. Even if the fit clearance between gears is smaller, the tooth surface clearance between teeth is also frequently converted. As the gears wear, the tooth surface clearance between the teeth will accelerate to expand, which will lead to failure of RV Reducer.

In addition, as is known to all, FM motor is widely used in electric-driven vehicle at present, with high efficiency at high speed, about 94%; but low efficiency at low speed, about 70% (see FIG. 4). According to the changes of road conditions, the electric-driven vehicle need to accelerate and decelerate frequently. Every time the electric-driven vehicle run from low speed to high speed, the electric-driven vehicle consume a lot of electric energy in vain. These consumed electric energy in electric-driven vehicle turns into heat and is taken away by cooling water.

There are also frequency conversion motors for electric-driven vehicle, which are in overload operation when the vehicle starts-up or climbs with a load, the peak value of motor power can reach more than one time of the rated power. The above two problems are the key to the failure of electric-driven vehicle to reach the designed mileage.

SUMMARY

The present disclosure is to solve the problems in the prior art. The purpose of the present disclosure is to provide a transmission device capable of cooperating with a dual-power source, wherein the transmission device includes a planetary gear assembly driven by the dual-power source. The planetary gear assembly includes a sun gear, a rotating inner ring gear and a planetary gear engaged between the sun gear and the rotating inner ring gear. The dual-power source includes an input shaft. The input shaft is connected with the sun gear. The dual-power source is configured to drive the sun gear to rotate in a first direction with respect to its own rotation axis through the input shaft. The dual-power source is connected with the rotating inner ring gear and drives the rotating inner ring gear to rotate in a second direction opposite to the first direction with respect to its own rotation axis. At the same time, the planetary gear rotates in the second direction with respect to its own rotation axis (for example, it is driven by the dual-power source, the rotation direction of the rotating inner ring gear and the planetary gear is the same through a synchronizer). The rotation direction of the planetary gear around the input shaft depends on the linear speed V1 of pitch circle motion of the rotating inner ring gear and the linear speed V2 of pitch circle motion of the sun gear.

According to an aspect of the present disclosure, the dual-power source includes a first power source and a second power source. The first power source is configured to drive the sun gear through the input shaft. The second power source is configured to drive the rotating inner ring gear.

According to the above aspects of the present disclosure, the planet gear is installed on a planetary gear holder. An output shaft is arranged on the planetary gear holder. The sun gear and the rotating inner gear ring are arranged coaxially. The output shaft and the input shaft are arranged coaxially.

According to the above aspects of the present disclosure, when the first direction is clockwise, the second direction is counterclockwise. When the first direction is counterclockwise, the second direction is clockwise.

According to the above aspects of the present disclosure, when the linear speed V1>the linear speed V2, the rotation direction of the planetary gear and the planetary gear holder around the input shaft is opposite to the rotation direction of the input shaft, the rotation direction of the output shaft itself is opposite to the rotation direction of the input shaft, and the tooth surface clearance between the tooth surface of the planetary gear and the tooth surface of the rotating inner ring gear which meshes with the planetary gear is located at one side of the teeth of the planetary gear only.

When the linear speed V1<the linear speed V2, the rotation direction of the planetary gear and the planetary gear holder around the input shaft is the same as the rotation direction of the input shaft, the rotation direction of the output shaft itself is the same as the rotation direction of the input shaft, and the tooth surface clearance between the tooth surface of the planetary gear and the tooth surface of the rotating inner ring gear which meshes with the planetary gear being maintained on said side of the teeth of the planetary gear.

When the linear speed V1=the linear speed V2, the rotation speed of the planetary gear and the planetary gear holder around the input shaft is zero, and the rotation speed of the output shaft itself is zero.

According to the above aspects of the present disclosure, a parallel gear is arranged on the rotating inner gear ring. An inner ring gear driven by the second power source is engaged/meshed with the parallel gear to drive the rotating inner ring gear.

According to the above aspects of the present disclosure, a sun wheel front gear is arranged on the input shaft. An input shaft gear driven by the first power source is engaged with the sun wheel front gear to drive the sun gear.

According to the above aspects of the present disclosure, the first power source is a constant power output, and the second power source is a variable speed power output. An electronic control device processes the error of loss of rotation or instability of the first power source at different power rate through an input control line.

According to the above aspects of the present disclosure, when the second power source drives the rotating inner ring gear to rotate, the movement data of the rotating inner ring gear is transmitted to the electronic control device through a real-time data acquisition line connected with the second power source. The electronic control device controls and adjusts the power output of the second power source through the real-time data acquisition line under the internal programming or processing of external instructions, so as to make the output shaft reach various speeds required when it is in working condition.

According to the above aspects of the present disclosure, the first power source is a variable speed power output, and the electronic control device controls the power output of the first power source through an input control line.

According to the above aspects of the present disclosure, the first power source and the second power source are controllable and adjustable power machinery.

According to the above aspects of the present disclosure, the controllable and adjustable power machinery is an electric motor or an internal combustion engine.

According to the present disclosure, an electric-driven vehicle is also provided, which includes a transmission device with dual-power source as described above.

A driving method for driving a transmission device is also provided according to the present disclosure, wherein the transmission device is based on the transmission device as described above. The transmission device includes dual-power source which drives a planetary gear assembly, wherein the planetary gear assembly includes a sun gear, a rotating inner ring gear and a planetary gear engaged between the sun gear and the rotating inner ring gear. The dual-power source includes an input shaft; connecting the input shaft with the sun gear. The dual-power source drives the sun gear to rotate in a first direction relative to its own rotation axis through the input shaft. The dual-power source is connected with the rotating inner ring gear and drives the rotating inner ring gear to rotate in a second direction opposite to the first direction with respect to its own rotation axis. At the same time, the planetary gear rotates in the second direction with respect to its own rotation axis. The rotation direction of the planetary gear around the input shaft depends on the linear speed V1 of the pitch circle motion of the rotating inner ring gear and the linear speed V2 of the pitch circle motion of the sun gear.

According to one aspect of the driving method described above, wherein the dual-power source includes a first power source and a second power source. The first power source drives the sun gear through the input shaft. The second power source drives the rotating inner ring gear.

According to various aspects of the driving method as described above, installing the planetary gear on the planetary gear holder; arranging the output shaft on the planetary gear holder; setting the sun gear and the rotating inner gear ring coaxially; setting the output shaft and the input shaft coaxially.

According to various aspects of the driving method described above, when the first direction is clockwise, the second direction is counterclockwise. When the first direction is counterclockwise, the second direction is clockwise.

According to various aspects of the driving method as described above, when the linear speed V1>the linear speed V2, the rotation direction of the planetary gear and the planetary gear holder around the input shaft is opposite to the rotation direction of the input shaft, the rotation direction of the output shaft itself is opposite to the rotation direction of the input shaft, the tooth surface clearance between the tooth surface of the planetary gear and the tooth surface of the rotating inner ring gear which engages with the planetary gear is located at one side of the teeth of the planetary gear only.

When the linear speed V1<the linear speed V2, the rotation direction of the planetary gear and the planetary gear holder around the input shaft is the same as the rotation direction of the input shaft, the rotation direction of the output shaft itself is the same as the rotation direction of the input shaft, and the tooth surface clearance between the tooth surface of the planetary gear and the tooth surface of the rotating inner ring gear which engages with the planetary gear being maintained on said side of the teeth of the planetary gear.

When the linear speed V1=the linear speed V2, the rotation speed of the planetary gear and the planetary gear holder around the input shaft is zero, and the rotation speed of the output shaft itself is zero.

According to various aspects of the driving method as described above, setting the first power source as constant power output, and setting the second power source as variable speed power output; providing an electronic control device. The electronic control device processes the error of loss of rotation or instability of the first power source at different power rate via an input control line.

According to various aspects of the driving method as described above, the second power source drives the rotating inner gear ring to rotate, and transmits the motion data of the rotating inner gear ring to the electronic control device through a real-time data acquisition line connected with the second power source The electronic control device controls and adjusts the power output of the second power source through the real-time data acquisition line under the internal programming or processing of external instructions, so as to make the output shaft reach various speeds required when it is in working condition.

According to various aspects of the driving method described above, setting the first power source as the adjustable power output, and the power output of the first power source is controlled by the electronic control device through the input control line.

According to various aspects of the driving method described above, setting the first power source and the second power source as controllable and adjustable power machinery.

According to various aspects of the driving method described above, the controllable and adjustable power machinery is an electric motor or an internal combustion engine.

According to various aspects of the driving method described above, arranging a parallel gear on the rotating inner ring gear; an inner ring gear driven by the second power source engages with the parallel gear to drive the rotating inner ring gear.

According to various aspects of the driving method described above, arranging a sun wheel front gear on the input shaft; an input shaft gear driven by the first power source engages with the front sun wheel gear so as to drive the sun gear.

One of the features of the transmission device with dual-power source according to the present disclosure is that the key problem that the tooth surface clearance (also known as backlash) generated when the teeth of the planetary gear and the teeth of the inner ring gear engaged during the operation of the planetary gear transmission is fundamentally eliminated by applying the mechatronics combination structure according to the present disclosure. In particular, it solves the problems of vibration, noise, wear and other defects caused by the impact between teeth caused by backlash when the gear frequently changes the direction of motion, thus prolonging the service life of the transmission device and ensuring the operation accuracy.

The transmission device with dual-power source according to the present disclosure can be applied to some high-end products requiring high precision, miniaturization, large torque and frequent change of output direction, such as industrial robot structure, wherein RV Reducer is arranged at each motion joint. The present disclosure realizes high positioning accuracy and long service life of RV Reducer. In particular, when the planetary gears change the direction of motion frequently, the tooth surface of the rotating inner ring gear will not be impacted by two forces in different directions frequently, and the backlash between teeth will not change frequently. In addition, even if the gear is worn, the backlash between the teeth will not be increased under the speed control of the electronic control device, so as to avoid the failure of RV Reducer.

In the dual-power transmission device according to the present disclosure, when the rotation direction of the sun gear, planetary gear and rotating inner ring gear themselves remain unchanged, the output shaft can easily rotate forward or reverse (as shown in FIG. 2), while the backlash between the teeth is only left on one side, and the force direction between the teeth is also unchanged, so the backlash between the teeth will not be changed due to the frequently changing direction of the output shaft. Because the teeth and teeth are in close mesh on only one side, no impact force caused by backlash conversion is generated. Therefore, the transmission device of the present disclosure has higher positioning accuracy with longer service life. Moreover, even if there is a large amount of wear between the teeth and the backlash of the teeth is increased, since the other side of the teeth are closely meshed, the perfect positioning accuracy and use effect still can be achieved under the correction control of the electronic control device.

The transmission device with dual-power source according to the present disclosure is also very suitable for the transmission device of pure electric-driven vehicle, wherein the two motors can not only fully operate within the speed range of the highest efficiency of the frequency conversion motor when the frequency is converted, but also the output shaft can be zero speed or positive and negative step less speed change and generates dozens of times more torque than the traditional pure electric-driven vehicle. If a traditional evb320-140-180 variable frequency motor is selected, its rated power is 30 kW, peak power is 60 kW, and peak torque is only 180 NM. Because when pure electric-driven vehicle is running, it needs to change speed frequently according to the road conditions, the pure electric-driven vehicle will accelerate from static state to dynamic state for countless times, but also need to go up different slopes and bear different loads. Therefore, the frequency conversion motor used in traditional pure electric-driven vehicles must have a large reserve power and run in a low efficiency area below 70% of the motor for a long time.

Under the same road conditions, according to the present disclosure, two dual-power transmission devices with 10 kW each can be selected. The total power is only 20 kW, and the maximum torque can be 9000 Nm to 10000 Nm (as shown in FIG. 5). These two motors can run with 95% high efficiency at the same time. The large torque of 9000 Nm or more can completely meet the requirements of pure electric-driven vehicle on any road condition.

Having compared the dual-power transmission device with a peak power of 20 kW only and a maximum torque of 9000 Nm according this disclosure with the traditional variable frequency motor with a peak power of 60 kW and a peak torque of 180 Nm, it can be concluded that if the transmission device according this disclosure is adopted, since the motor can always be operated within the high-efficiency operation speed range to avoid the low-efficiency operation speed range, the motor configuration with smaller power rate can be selected under the same road conditions. Therefore, if a traditional pure electric-driven vehicle equips with the dual-power planetary gear transmission device according to this disclosure, it can greatly adapt to its driving conditions and greatly extend its driving mileage. The dual-power source in this disclosure can also select the controllable and adjustable high-power internal combustion engine or other power machinery when the transmission device with high power and high torque output is required. The present disclosure is also applied to other mechanical products which requires forward and reverse speed change.

EMBODIMENTS

The embodiments of the present disclosure will be described in detail below in combination with the accompanying drawings.

Figure 1:
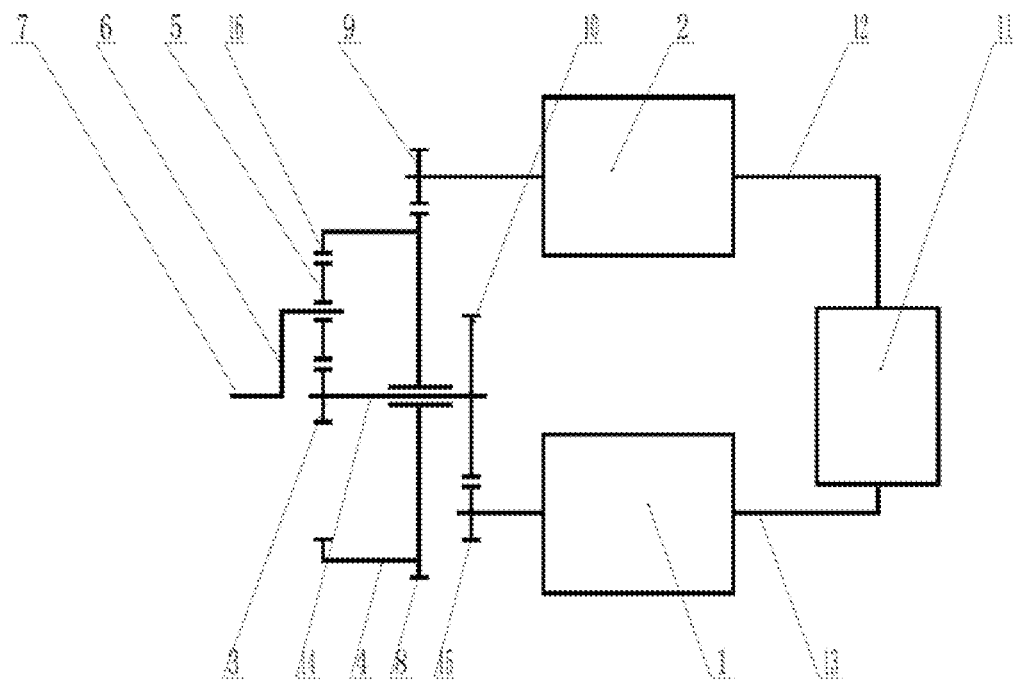
FIG. 1 shows a schematic diagram of a transmission device with dual-power source according to the present disclosure.

FIG. 1 shows a schematic diagram of a transmission device with dual-power source according to the present disclosure, wherein according to an embodiment of the present disclosure, the transmission device with dual-power source includes a planetary wheel assembly driven by the dual-power source.

The planetary gear assembly includes a sun gear 3, a rotating inner ring gear 4 and a planet gear 5 meshed/engaged between the sun gear 3 and the rotating inner ring gear 4.

The dual-power source includes an input shaft 14, a first power source 1 and a second power source 2. The input shaft 14 is connected with the sun gear 3; the dual-power source is configured to drive the sun gear 3 to rotate in a first direction relative to its own rotation axis through the input shaft 14. The dual-power source is connected with the rotating inner ring gear 4 and drives the rotating inner ring gear 4 to rotate relative to its rotation axis in a second direction opposite to the first direction, at the same time, the planetary gear 5 rotates in the second direction relative to its own rotation axis. The rotation direction of the planetary gear 5 around the input shaft 14 depends on the linear speed V1 of the pitch motion of the inner ring gear 4 and the linear speed V2 of the pitch motion of the sun gear 3.

According to an embodiment of the present disclosure, the first power source 1 is configured to drive the sun gear 3 through the input shaft 14; and the second power source 2 is configured to drive the rotating inner ring gear 4.

According to the above embodiments of the present disclosure, the planetary gear 5 is installed on a planetary gear holder 6. An output shaft 7 is arranged on the planetary gear holder 6. The sun gear 3 and the rotating inner gear ring 4 are arranged coaxially. The output shaft 7 and the input shaft 14 are arranged coaxially.

According to the above embodiments of the present disclosure, when the first direction is clockwise, the second direction is counterclockwise. When the first direction is counterclockwise, the second direction is clockwise.

Figure 2:
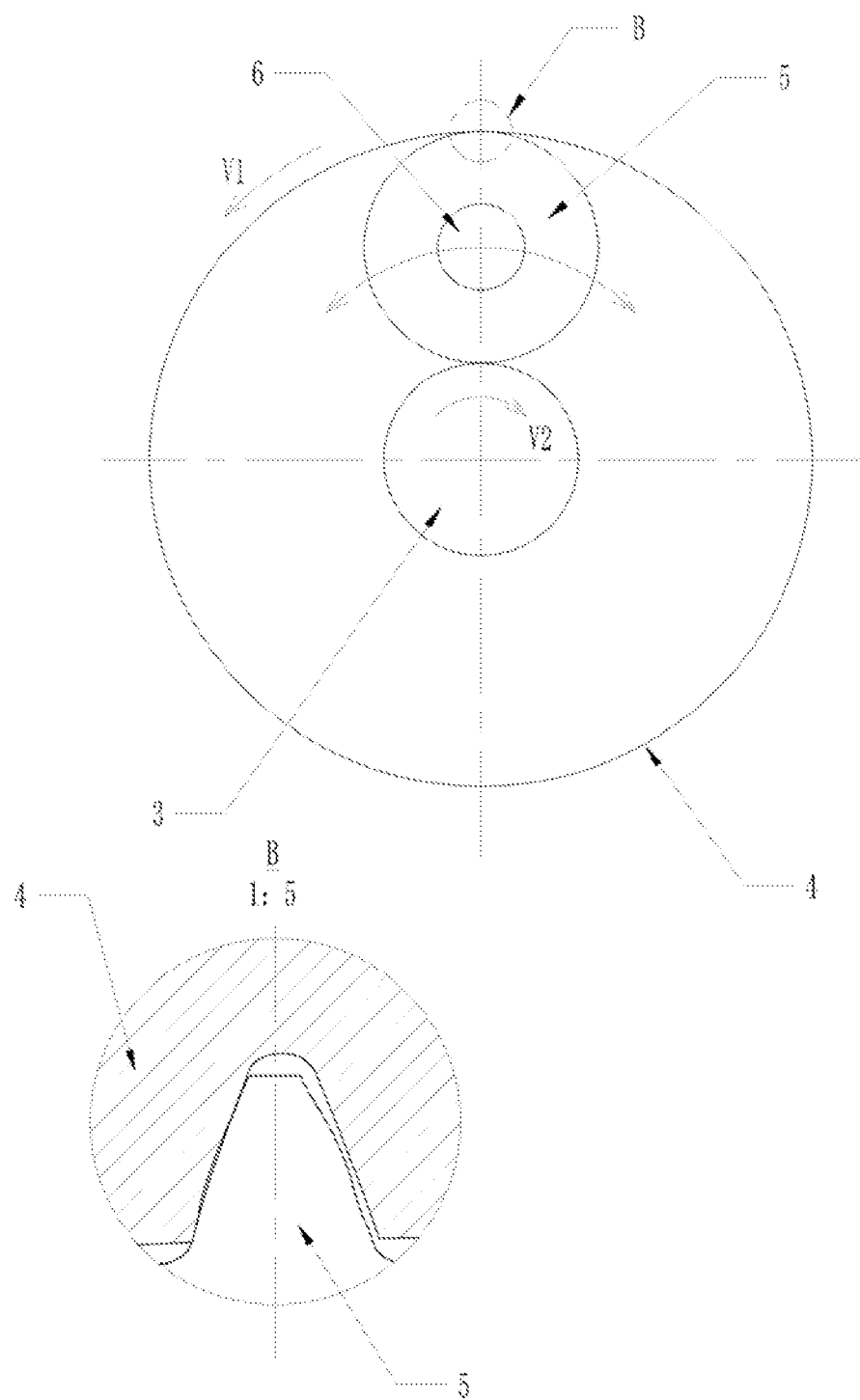
FIG. 2 shows the backlash between the teeth of the rotating inner ring gear and the teeth of the planetary gear when the sun gear rotates in the clockwise direction according to the present disclosure.
Figure 3:
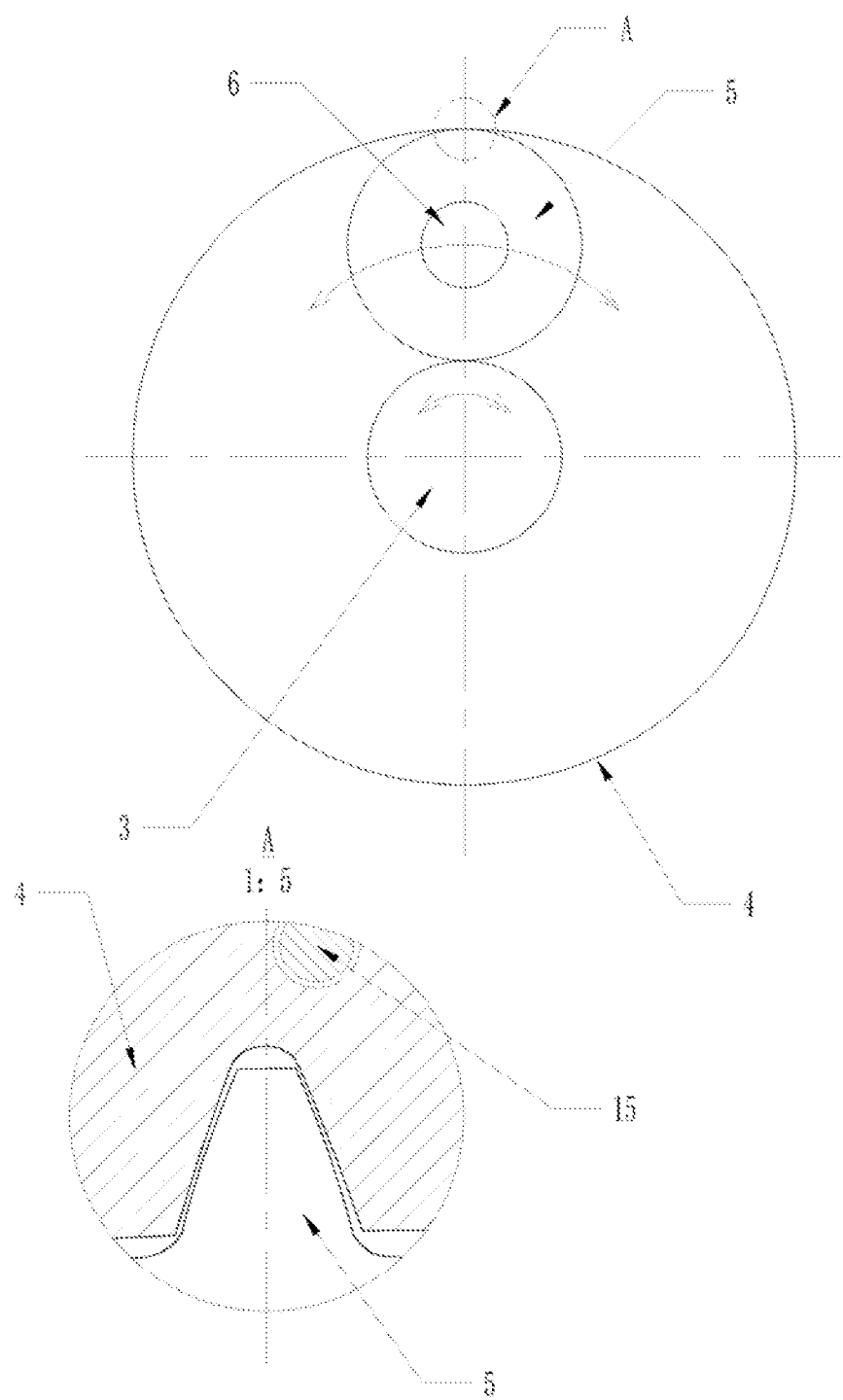
FIG. 3 shows that there is backlash in the transmission device with conventional planetary wheel assembly in the existing technology.
Figure 4:
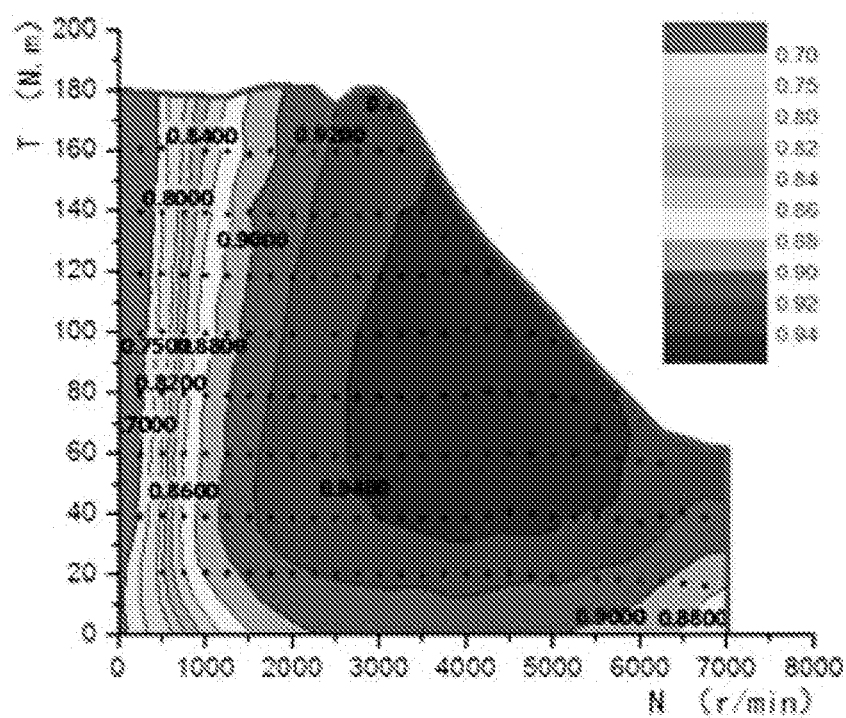
FIG. 4 shows a torque diagram of a conventional FM motor.

According to the above embodiments of the present disclosure, when V1> V2, the rotation direction of the planetary gear 5 and the planetary gear holder 6 around the input shaft 14 is opposite to the rotation direction of the input shaft 14, the rotation direction of the output shaft 7 itself is opposite to the rotation direction of the input shaft 14, and the tooth surface clearance (also known as backlash) between the tooth surface of the planetary gear 5 and the teeth surface of the rotating inner ring gear 4 which meshes with the planetary gear 5 is only located on one side of the teeth of the planetary gear 5. For example, as shown in FIG. 2, when the input shaft 14 drives the sun gear 3 to rotate in a clockwise direction relative to its own rotation axis, the output shaft 7 itself rotates in a counterclockwise direction, the tooth surface clearance is only located on the right side of the teeth of the planetary gear 5, and the left side of the teeth of the planetary gear 5 contacts with the tooth surface of the inner ring gear 4. It can be understood by those skilled in the art that when the input shaft 14 drives the sun gear 3 to rotate in a counter clockwise direction (not shown) relative to its own rotation axis, the output shaft 7 itself rotates in a clockwise direction, and the tooth surface clearance is only located on the left side of the teeth of the planet gear 5, and the right side of the teeth of the planet gear 5 contacts with the tooth surface of the inner ring gear 4.

When V1<V2, the rotation direction of the planetary gear 5 and the planetary gear holder 6 around the input shaft 14 is the same as the rotation direction of the input shaft 14, the rotation direction of the output shaft 7 itself is the same as the rotation direction of the input shaft 14, and the tooth surface clearance between the tooth surface of the planetary gear 5 and the tooth surface of the rotating inner ring gear 4 meshed with the planetary gear 5 is maintained at said side of the teeth of gear 5. For example, as shown in FIG. 2, when the input shaft 14 drives the sun gear 3 to rotate in a clockwise direction relative to its own rotation axis, the output shaft 7 itself rotates in a clockwise direction, the tooth surface clearance is still only located on the right side of the teeth of the planetary gear 5, and the left side of the teeth of the planetary gear 5 still contacts with the tooth surface of the rotating inner ring gear 4. It can be understood by those skilled in the art that when the input shaft 14 drives the sun gear 3 to rotate in the counter clockwise direction (not shown) relative to its own rotation axis, the output shaft 7 rotates in the counter clockwise direction, and the tooth surface clearance is still only located on the left side of the teeth of the planet gear 5, and the right side of the teeth of the planet gear 5 still contacts with the tooth surfaces of the rotating inner ring gear 4.

When V1=V2, the rotation speed of the planetary gear 5 and the planetary gear holder 6 around the input shaft 14 is zero, and the rotation speed of the output shaft 7 itself is zero.

According to the above embodiments of the present disclosure, a parallel gear 8 is arranged on the rotating inner ring gear 4. An inner ring gear 9 driven by the second power source 2 meshes with the parallel gear 8 to drive the rotating inner ring gear 4.

According to the above embodiments of the present disclosure, the input shaft 14 is provided with a sun wheel front gear 10. An input shaft gear 15 driven by the first power source 1 meshes/engages with the sun wheel front gear 10 to drive the sun gear 3.

Setting the inner ring gear 9 to engage with the parallel gear 8 and setting the input shaft gear 15 to engage with the sun wheel front gear 10 can provide more space for accommodating the first and second power sources, especially when a large power source is required.

According to the above embodiments of the present disclosure, the first power source 1 is a constant power output, and the second power source 2 is a variable speed power output. An electronic control device 11 is provided to process the error of loss of rotation or instability of the first power source 1 at different power through an input control line 13.

According to the above embodiments of the present disclosure, when the second power source 2 drives the rotating inner ring gear 4 to rotate, the movement data of the rotating inner ring gear 4 is transmitted to the electronic control device 11 through a real-time data acquisition line 12 connected with the second power source 2. The electronic control device 11 controls and adjusts the power output of the second power source 2 through the real-time data acquisition line 12 under the internal programming or processing of external instructions, so as to make the output shaft 7 reach various speeds required when it is in working condition.

According to the above embodiments of the present disclosure, the first power source 1 is a variable speed power output, and the electronic control device 11 controls the power output of the first power source 1 through the input control line 13.

Under the correction control of the electronic control device 11, it is also helpful to keep the tooth surface clearance between the tooth surface of the planetary gear 5 and the tooth surface of the rotating inner ring gear 4 meshed with the planetary gear 5 only on one side of the teeth of the planetary gear 5.

According to the above embodiments of the present disclosure, the first power source and the second power source are controllable and adjustable power machinery.

According to the above embodiments of the present disclosure, the controllable and adjustable power machinery is an electric motor or an internal combustion engine.

In the dual-power transmission device according to the present disclosure, when the rotation direction of the sun gear 3, planetary gear 5 and rotating inner ring gear 4 themselves remain unchanged, the output shaft 7 can easily rotate forward or reverse (as shown in FIG. 2), while the backlash between the teeth is only located on one side, and the force direction between the teeth is also unchanged, so the backlash between the teeth will not be changed due to the frequently changing direction of the output shaft. Because the teeth and teeth are in close mesh on one side only, no impact force caused by backlash conversion is generated. Therefore, the transmission device of the present disclosure has higher positioning accuracy with longer service life. Moreover, even if there is a large amount of wear between the teeth and the backlash of the teeth is increased, since the other side of the teeth are closely meshed, the perfect positioning accuracy and use effect still can be achieved under the correction control of the electronic control device 11.

According to the present disclosure, an electric-driven vehicle is also provided, which includes the transmission device with dual-power source as described in the above embodiments.

The transmission device with dual-power source according to the present disclosure is very suitable for the transmission device of pure electric-driven vehicle, wherein the two motors can not only fully operate within the speed range of the highest efficiency of the frequency conversion motor when the frequency is converted, but also the output shaft can be zero speed or positive and negative step less speed change and generates dozens of times more torque than the traditional pure electric-driven vehicle.

If a traditional evb320-140-180 variable frequency motor is selected, its rated power is 30 kW, the peak power is 60 kW, and the peak torque is only 180 NM. Because when pure electric-driven vehicle is running, it needs to change speed frequently according to the road conditions, the pure electric-driven vehicle will accelerate from static state to dynamic state for countless times, but also need to climb different slopes and bear different loads, the variable frequency motor used in traditional pure electric-driven vehicles must has a large reserve power and has to run in a low efficiency area below 70% of the motor for a long time.

Figure 5:
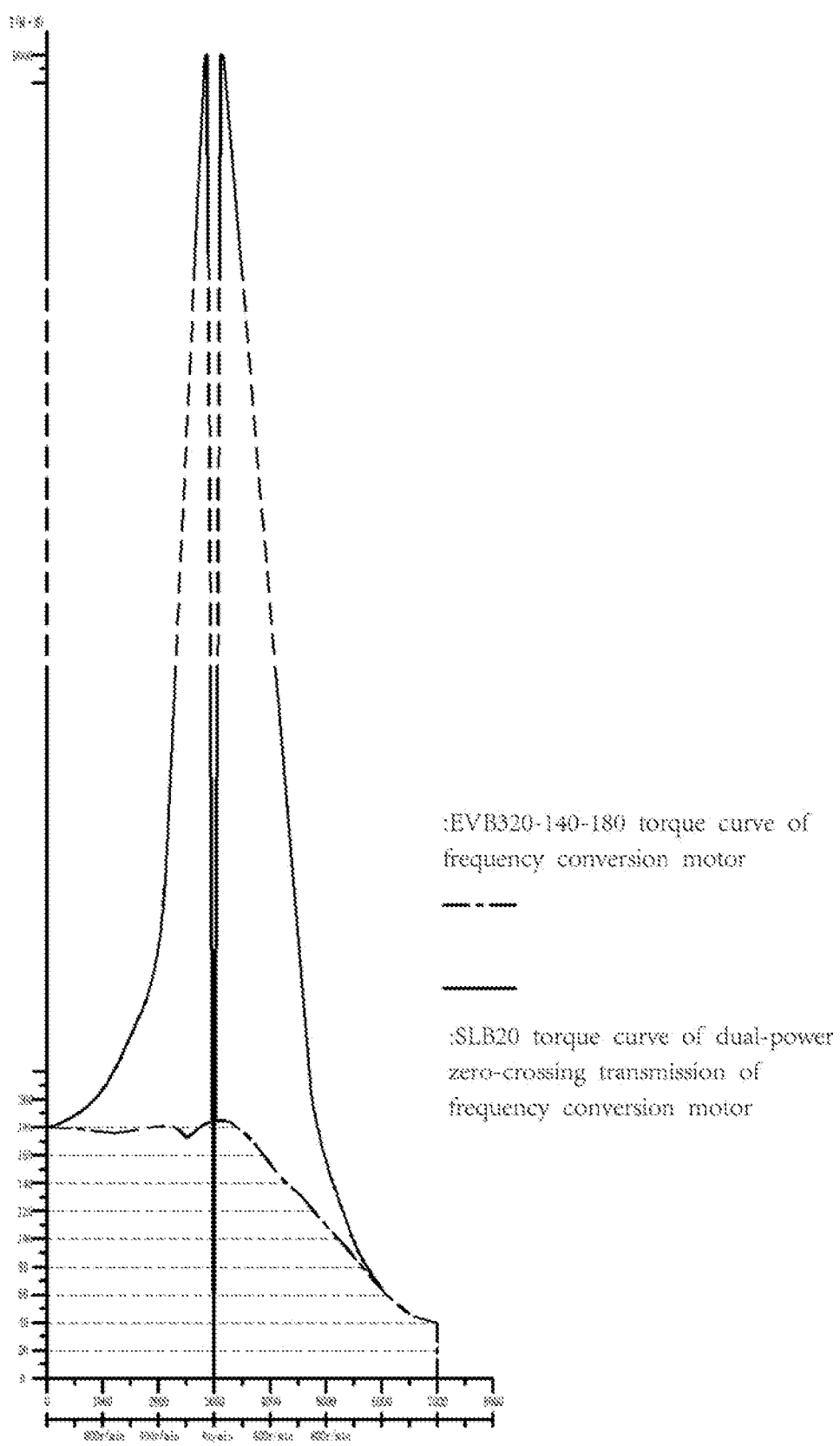
FIG. 5 shows a torque diagram of a transmission device with dual-power source according to the present disclosure.

Under the same road conditions, according to the present disclosure, two dual-power transmission devices with 10 kW each can be selected. The total power is only 20 kW, and the maximum torque can be 9000 Nm to 10000 Nm (as shown in FIG. 5). These two motors can run with 95% high efficiency at the same time. The large torque of 9000 Nm or more can completely meet the requirements of pure electric-driven vehicle on any road condition.

Having compared the dual-power transmission device with a peak power of 20 kW only and a maximum torque of 9000 Nm according to the present disclosure with the traditional variable frequency motor with a peak power of 60 kW and a peak torque of 180 Nm, it can be concluded that if the transmission device according this disclosure is adopted, since the motor can always be operated within the high-efficiency operation speed range to avoid the low-efficiency operation speed range, the motor configuration with smaller power rate can be selected under the same road conditions. Therefore, if a traditional pure electric-driven vehicle equips with the dual-power planetary gear transmission device according to the present disclosure, it can greatly adapt to its driving conditions and greatly extend its driving mileage. The dual-power source in this disclosure can also select a controllable and adjustable high-power internal combustion engine or other power machinery when the transmission device with high power and high torque output is required. The present disclosure is also applied to other mechanical products which requires forward and reverse speed change.

The present disclosure also provides a driving method for driving a transmission device, wherein the transmission device is based on the transmission device as described above. The transmission device includes dual-power source which drives a planetary gear assembly. The planetary gear assembly includes a sun gear 3, a rotating inner ring gear 4 and a planetary gear 5 engaged between the sun gear 3 and the rotating inner ring gear 4. The dual-power source includes an input shaft 14 which is connected with the sun gear 3. The dual-power source drives the sun gear 3 to rotate in a first direction relative to its own rotation axis through the input shaft 14. The dual-power source is connected with the rotating inner ring gear 4 and drives the rotating inner ring gear 4 to rotate in a second direction opposite to the first direction with respect to its own rotation axis. At the same time, the planetary gear 5 rotates in the second direction with respect to its own rotation axis. The rotation direction of the planetary gear 5 around the input shaft 14 depends on the linear speed V1 of the pitch circle motion of the rotating inner ring gear 4 and the linear speed V2 of the pitch circle motion of the sun gear 3.

According to an embodiment of the driving method as described above, the dual-power source includes a first power source 1 and a second power source 2; the first power source 1 drives the sun gear 3 through the input shaft 14; the second power source 2 drives the rotating inner ring gear 4.

According to various embodiments of the driving method described above, installing the planetary gear 5 on the planetary gear holder 6; arranging the output shaft 7 on the planetary gear holder 6; setting the sun gear 3 and the rotating inner gear ring 4 coaxially; setting the output shaft 7 and the input shaft 14 coaxially.

According to various embodiments of the driving method described above, when the first direction is clockwise, the second direction is counterclockwise; when the first direction is counterclockwise, the second direction is clockwise.

According to various embodiments of the driving method as described above, when V1> V2, the rotation direction of the planetary gear 5 and the planetary gear holder 6 around the input shaft 14 is opposite to the rotation direction of the input shaft 14, the rotation direction of the output shaft 7 itself is opposite to the rotation direction of the input shaft 14, and the tooth surface clearance (also known as backlash) between the tooth surface of the planetary gear 5 and the teeth surface of the rotating inner ring gear 4 which meshes with the planetary gear 5 is only located on one side of the teeth of the planetary gear 5. It can be understood by those skilled in the art that when the input shaft 14 drives the sun gear 3 to rotate in a counter clockwise direction (not shown) relative to its own rotation axis, the output shaft 7 rotates in a clockwise direction, and the tooth surface clearance is only located on the left side of the teeth of the planet gear 5, while the right side of the teeth of the planet gear 5 contacts with the tooth surface of the inner ring gear 4.

When V1<V2, the rotation direction of the planetary gear 5 and the planetary gear holder 6 around the input shaft 14 is the same as the rotation direction of the input shaft 14, the rotation direction of the output shaft 7 itself is the same as the rotation direction of the input shaft 14, and the tooth surface clearance between the tooth surface of the planetary gear 5 and the tooth surface of the rotating inner ring gear 4 meshed with the planetary gear 5 is maintained at said side of the teeth of gear 5. It can be understood by those skilled in the art that when the input shaft 14 drives the sun gear 3 to rotate in the counter clockwise direction (not shown) relative to its own rotation axis, the output shaft 7 rotates in the counter clockwise direction, and the tooth surface clearance is still located on the left side of the teeth of the planet gear 5 only, while the right side of the teeth of the planet gear 5 still contacts with the tooth surfaces of the rotating inner ring gear 4.

When V1=V2, the rotation speed of the planetary gear 5 and the planetary gear holder 6 around the input shaft 14 is zero, and the rotation speed of the output shaft 7 itself is zero.

According to various embodiments of the driving method as described above, setting the first power source 1 as constant power output, and setting the second power source 2 as variable speed power output; providing an electronic control device 11; the electronic control device 11 processes the error of loss of rotation or instability of the first power source 1 at different powers through an input control line 13.

According to various embodiments of the driving method described above, the second power source 2 drives the rotating inner gear ring 4 to rotate, and transmits the motion data of the rotating inner gear ring 4 to the electronic control device 11 through a real-time data acquisition line 12 connected with the second power source 2. The electronic control device 11 controls and adjusts the power output of the second power source 2 through the real-time data acquisition line 12 under the internal programming or processing of external instructions, so as to make the output shaft 7 reach various speeds required when it is in working condition.

According to various embodiments of the driving method described above, setting the first power source 1 as the adjustable speed power output, and the power output of the first power source 1 is controlled by the electronic control device 11 through the input control line 13.

According to various embodiments of the driving method described above, arranging a parallel gear 8 on the rotating inner ring gear 4; an inner ring gear 9 driven by the second power source 2 engages with the parallel gear 8 to drive the rotating inner ring gear 4.

According to various embodiments of the driving method described above, arranging a sun wheel front gear 10 on the input shaft 14; an input shaft gear 15 driven by the first power source 1 engages with the front sun wheel front gear 10 so as to drive the sun gear 3.

According to various embodiments of the driving method described above, setting the first power source and the second power source as controllable and adjustable power machinery.

According to various embodiments of the drive method described above, the controllable and adjustable power machinery is an electric motor or an internal combustion engine.

What is claimed is:

1. A transmission device capable of cooperating with a dual-power source, the dual-power source including an input shaft, wherein the transmission device comprises:
    a planetary gear assembly driven by the dual-power source, the planetary gear assembly includes a sun gear, a rotating inner ring gear and a planetary gear engaged between the sun gear and the rotating inner ring gear; the input shaft is connected with the sun gear, wherein the rotating inner ring gear includes a tooth surface and a parallel gear;
    the dual-power source is configured to drive the sun gear to rotate in a first direction with respect to its own rotation axis through the input shaft;
    the dual-power source is connected with the rotating inner ring gear and drives the rotating inner ring gear to rotate in a second direction opposite to the first direction with respect to its own rotation axis, at the same time, the planetary gear rotates in the second direction with respect to its own rotation axis; the rotation direction of the planetary gear around the input shaft depends on the linear speed V1 of pitch circle motion of the rotating inner ring gear and the linear speed V2 of pitch circle motion of the sun gear;
    wherein the dual-power source includes a first power source and a second power source;
    the first power source is configured to drive the sun gear through the input shaft; the second power source is configured to drive the rotating inner ring gear;
    a sun wheel front gear is arranged on the input shaft;
    an input shaft gear driven by the first power source is engaged with the sun wheel front gear to drive the sun gear;
    the input shaft is arranged to pass through the rotating inner ring gear; and
    the sun gear is located on one side of the rotating inner ring gear and the sun wheel front gear is located on another side of the rotating inner ring gear, wherein the sun gear is connected with the sun wheel front gear through the input shaft only;
    wherein, in an axial direction along the input shaft, the sun wheel front gear is disposed between the rotating inner ring gear and the first power source and between the rotating ring gear and the second power source;
    wherein the tooth surface and the parallel gear are separated in the axial direction along the input shaft, and the parallel gear is disposed between the sun gear and the sun gear front gear in the axial direction along the input shaft.

2. The transmission device capable of cooperating with the dual-power source according to claim 1, wherein
    the planet gear is installed on a planetary gear holder;
    an output shaft is arranged on the planetary gear holder;
    the sun gear and the rotating inner ring gear are arranged coaxially;
    the output shaft and the input shaft are arranged coaxially.

3. The transmission device capable of cooperating with the dual-power source according to claim 2, wherein the parallel gear is arranged on the rotating inner gear ring; and an inner ring gear driven by the second power source is engaged with the parallel gear to drive the rotating inner ring gear.

4. The transmission device capable of cooperating with the dual-power source according to claim 3, wherein the first power source is a constant power output, and the second power source is a variable speed power output; and
    an electronic control device processes the error of loss of rotation or instability of the first power source at different power through an input control line.

5. The transmission device with capable of cooperating with the dual-power source according to claim 4, wherein when the second power source drives the rotating inner ring gear to rotate, the movement data of the rotating inner ring gear is transmitted to the electronic control device through a real-time data acquisition line which is connected with the second power source; and
    the electronic control device controls and adjusts the power output of the second power source through the real-time data acquisition line under an internal programming or processing of external instructions, so as to make the output shaft reach various speeds required when it is in working condition.

6. The transmission device capable of cooperating with the dual-power source according to claim 5, wherein the first power source is a variable speed power output, and the electronic control device controls the power output of the first power source through an input control line.

7. The transmission device capable of cooperating with the dual-power source according to claim 2,
wherein when the linear speed V1>the linear speed V2, the rotation direction of the planetary gear and the planetary gear holder around the input shaft is opposite to the rotation direction of the input shaft, the rotation direction of the output shaft itself is opposite to the rotation direction of the input shaft, and the tooth surface clearance between the tooth surface of the planetary gear and the tooth surface of the rotating inner ring gear which meshes with the planetary gear is located at one side of the teeth of the planetary gear only;
when the linear speed V1<the linear speed V2, the rotation direction of the planetary gear and the planetary gear holder around the input shaft is the same as the rotation direction of the input shaft, the rotation direction of the output shaft itself is the same as the rotation direction of the input shaft, and the tooth surface clearance between the tooth surface of the planetary gear and the tooth surface of the rotating inner ring gear which meshes with the planetary gear being maintained on said side of the teeth of the planetary gear;
when the linear speed V1=the linear speed V2, the rotation speed of the planetary gear and the planetary gear holder around the input shaft is zero, and the rotation speed of the output shaft itself is zero.

8. An electric-driven vehicle, it includes a transmission device capable of cooperating with a dual-power source according to claim 1.

9. A driving method for driving a transmission device, wherein the transmission device includes dual-power source;
the dual-power source drives a planetary gear assembly, the planetary gear assembly includes a sun gear, a rotating inner ring gear and a planetary gear engaged between the sun gear and the rotating inner ring gear, wherein the rotating inner ring gear includes a tooth surface and a parallel gear;
the dual-power source includes an input shaft;
connecting the input shaft with the sun gear;
the dual-power source drives the sun gear to rotate in a first direction relative to its own rotation axis through the input shaft;
the dual-power source is connected with the rotating inner ring gear and drives the rotating inner ring gear to rotate in a second direction opposite to the first direction with respect to its own rotation axis, at the same time, the planetary gear rotates in the second direction with respect to its own rotation axis;
the linear speed V1 of the pitch circle motion of the rotating inner ring gear and the linear speed V2 of the pitch circle motion of the sun gear determine the rotation direction of the planetary gear around the input shaft,
wherein the dual-power source includes a first power source and a second power source;
the first power source drives the sun gear through the input shaft;
the second power source drives the rotating inner ring gear;
arranging a sun wheel front gear on the input shaft;
an input shaft gear driven by the first power source engages with the front sun wheel gear so as to drive the sun gear;
the input shaft is arranged to pass through the rotating inner ring gear; and the sun gear is located on one side of the rotating inner ring gear and the sun wheel front gear is located on another side of the rotating inner ring gear, wherein the sun gear is connected with the sun wheel front gear through the input shaft only; wherein, in an axial direction along the input shaft, the sun wheel front gear is disposed between the rotating inner ring gear and the first power source and between the rotating ring gear and the second power source; and
wherein the tooth surface and the parallel gear are separated in the axial direction along the input shaft, and the parallel gear is disposed between the sun gear and the sun gear front gear in the axial direction along the input shaft.

10. The driving method according to claim 9, wherein
installing the planetary gear on a planetary gear holder;
arranging an output shaft on the planetary gear holder;
setting the sun gear and the rotating inner gear ring coaxially;
setting the output shaft and the input shaft coaxially.

11. The driving method according to claim 10, wherein when the linear speed V1>the linear speed V2, the rotation direction of the planetary gear and the planetary gear holder around the input shaft is opposite to the rotation direction of the input shaft, the rotation direction of the output shaft itself is opposite to the rotation direction of the input shaft, the tooth surface clearance between the tooth surface of the planetary gear and the tooth surface of the rotating inner ring gear which engages with the planetary gear is only located at one side of the teeth of the planetary gear;
when the linear speed V1<the linear speed V2, the rotation direction of the planetary gear and the planetary gear holder around the input shaft is the same as the rotation direction of the input shaft, the rotation direction of the output shaft itself is the same as the rotation direction of the input shaft, and the tooth surface clearance between the tooth surface of the planetary gear and the tooth surface of the rotating inner ring gear which engages with the planetary gear being maintained on said side of the teeth of the planetary gear;
when the linear speed V1=the linear speed V2, the rotation speed of the planetary gear and the planetary gear holder around the input shaft is zero, and the rotation speed of the output shaft itself is zero.

12. The driving method according to claim 11, wherein
arranging the parallel gear on the rotating inner ring gear;
an inner ring gear driven by the second power source engages with the parallel gear to drive the rotating inner ring gear.

13. The driving method according to claim 9, wherein setting the first power source as constant power output, and setting the second power source as variable speed power output;
providing an electronic control device; and
the electronic control device processes the error of loss of rotation or instability of the first power source at different powers via an input control line.

14. The driving method according to claim 13, wherein the second power source drives the rotating inner gear ring to rotate, and transmits the motion data of the rotating inner gear ring to the electronic control device through a real-time data acquisition line connected with the second power source;
the electronic control device controls and adjusts the power output of the second power source through the real-time data acquisition line under an internal programming or processing of external instructions, so as to make the output shaft reach various speeds required when it is in working condition.

15. The driving method according to claim 13, wherein setting the first power source as the adjustable power output, and the power output of the first power source is controlled by the electronic control device through the input control line.

* * * * *